(12) United States Patent
Zimmerman et al.

(10) Patent No.: US 6,733,809 B2
(45) Date of Patent: May 11, 2004

(54) METHOD FOR APPLYING DRY TOPPINGS TO BAKED GOODS

(75) Inventors: Bill Zimmerman, Gresham, OR (US); Kim Arnold, Eugene, OR (US); Keith Sammons, Eugene, OR (US); Jim Hampton, Springfield, OR (US); Clyde Carson, Springfield, OR (US)

(73) Assignee: United States Bakery, Inc., Portland, OR (US)

( * ) Notice: Subject to any disclaimer, the term of this patent is extended or adjusted under 35 U.S.C. 154(b) by 77 days.

(21) Appl. No.: 09/935,147

(22) Filed: Aug. 21, 2001

(65) Prior Publication Data

US 2004/0071843 A1 Apr. 15, 2004

(51) Int. Cl.[7] .................................................. A23P 1/08
(52) U.S. Cl. ........................ 426/293; 426/302; 426/305; 426/289; 118/13
(58) Field of Search ................................ 426/302, 305, 426/289, 293, 94, 96, 103; 118/13

(56) References Cited

U.S. PATENT DOCUMENTS

| | | | | | |
|---|---|---|---|---|---|
| 3,717,752 | A | * | 2/1973 | Warning | 239/654 |
| 3,723,137 | A | * | 3/1973 | Fischer | 426/293 |
| 5,254,353 | A | * | 10/1993 | Huang et al. | 426/94 |
| 5,354,567 | A | * | 10/1994 | Huang et al. | 426/94 |
| 5,707,448 | A | * | 1/1998 | Cordera et al. | 118/13 |
| 5,798,132 | A | * | 8/1998 | Chen et al. | 426/305 |
| 5,827,553 | A | * | 10/1998 | Dimitroglou et al. | 426/89 |
| 6,056,025 | A | * | 5/2000 | Wegman | 141/67 |
| 6,352,732 | B2 | * | 3/2002 | Lanner et al. | 426/295 |

* cited by examiner

*Primary Examiner*—Carolyn Paden
(74) *Attorney, Agent, or Firm*—Marger Johnson & McCollom, PC

(57) ABSTRACT

The method for applying dry toppings to baked goods includes the steps of pre-treating a surface of the baked goods, after baking, with an adhesive substance such as a pregelatinized wheat starch suspended in a solution and thereafter applying the dry toppings to the treated surface. Such an application has been shown to decrease wastage of such items as sesame seed topping from as much as 50% to as little as 5%.

2 Claims, 6 Drawing Sheets

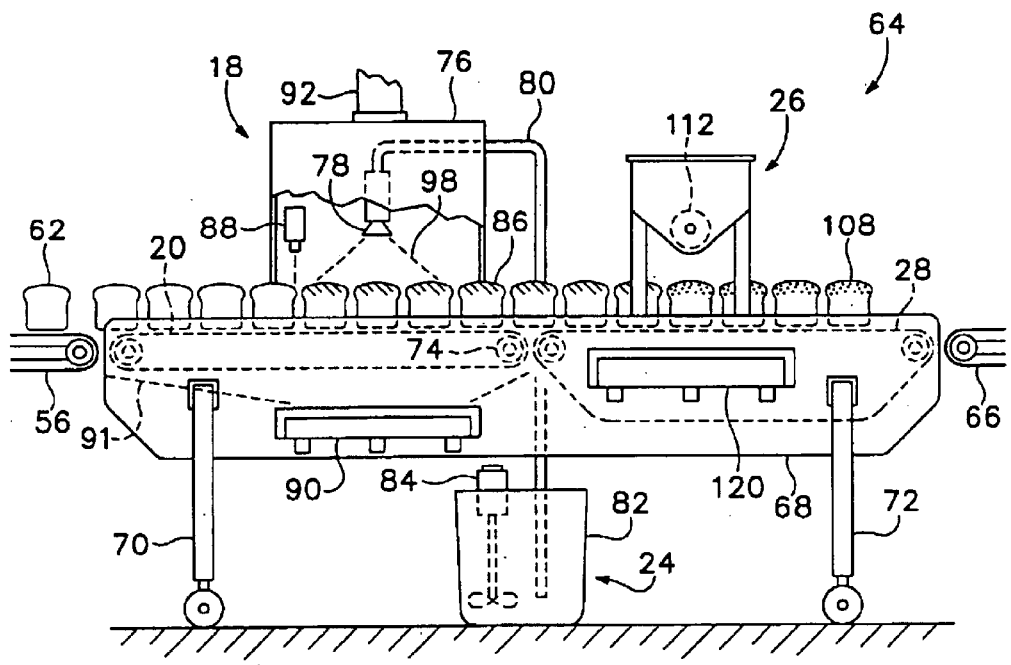
FIG.4
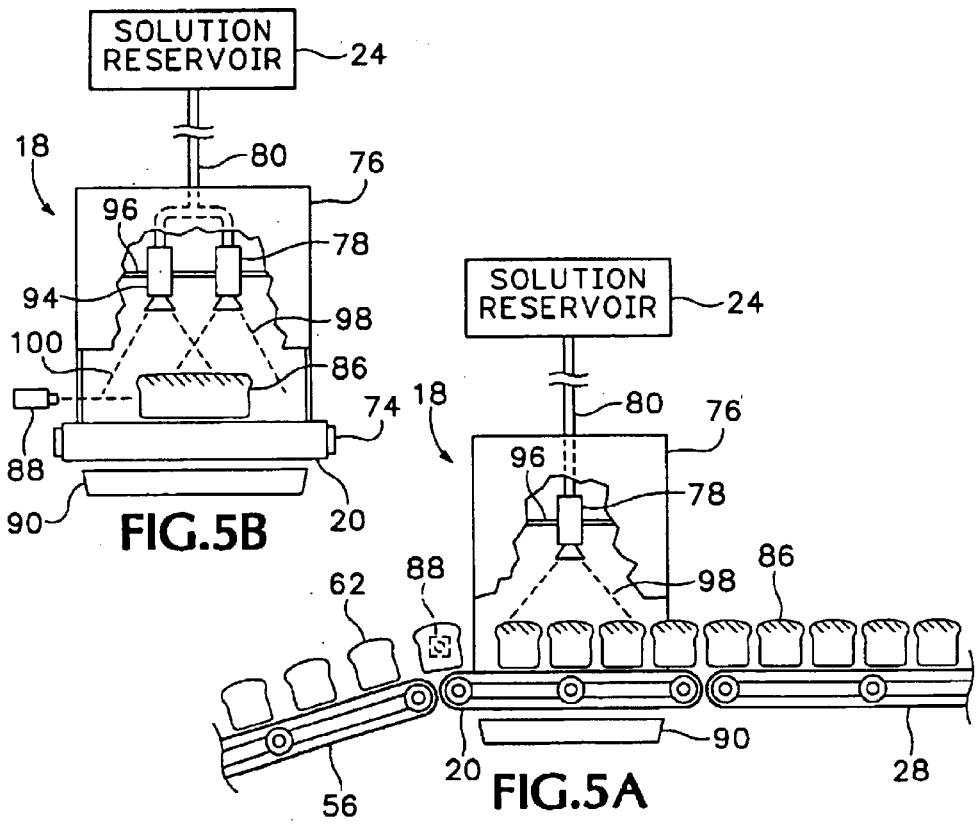
FIG.5B
FIG.5A

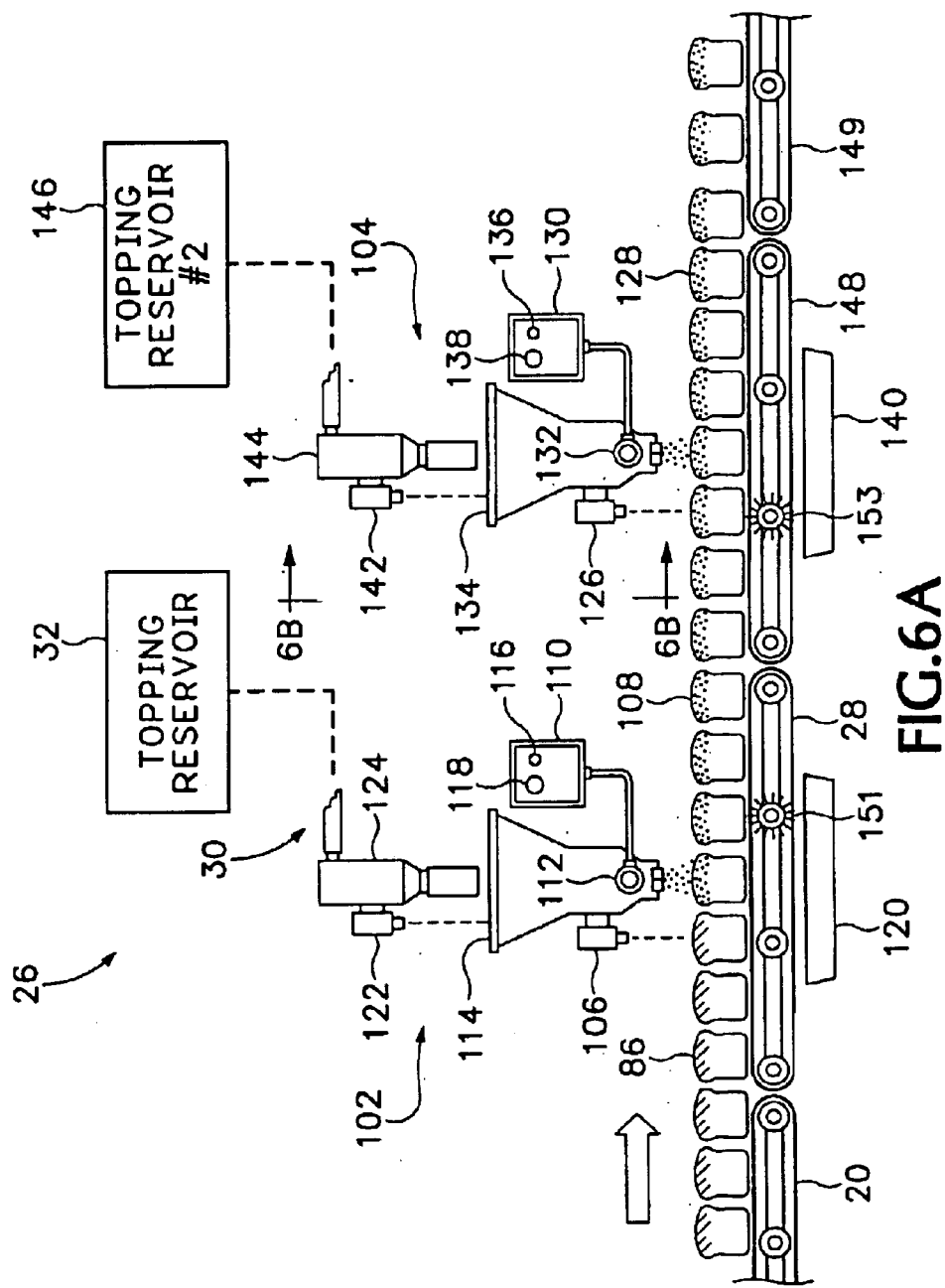

METHOD FOR APPLYING DRY TOPPINGS TO BAKED GOODS

BACKGROUND OF THE INVENTION

This invention relates generally to food processing and more particularly to a method and apparatus for applying dry toppings, such as sesame seeds, on bakery products.

Baked goods, such as hamburger buns, are typically produced in a multi-step process that includes making the dough, placing the dough into baking pans, applying seeds or the like to the top of the dough, baking the seeded dough, and then depanning the baked goods for packaging.

The conventional practice within the baked goods industry is to apply seeds or other dry toppings to the dough prior to baking. It is well known that it is easier to apply seeds or other dry toppings to the sticky surface of the dough than to the drier surface of the already baked goods. Still, it has been estimated that as much as 25%–50% of the sesame seeds applied to prebaked dough are wasted in later processing steps. That is, the seeds bounce off the dough into the pan or conveyor during the application process, the seeds fall off into the oven during baking, or the seeds are pulled from the goods during the depanning process. Additionally, many seeds baked with the goods will adhere to the pans in which the goods are baked, thus making cleaning and removal difficult. A pan used to make loaves with sesame seeds one day might be used the next to make loaves topped with caraway seeds. Any remaining sesame seeds on the pan from the first day can cross-contaminate with later products. This can pose a big problem as not only will wasted seeds increase the cost of the goods and reduce the cleanliness of the bakery, but cross-contamination and increased allergens can result.

Accordingly, the need remains for an improved method and apparatus for addressing these drawbacks of the prior art.

SUMMARY OF THE INVENTION

The method for applying dry toppings to baked goods includes the steps of pretreating a surface of the baked goods, after baking, with an adhesive substance such as a pregelatinized wheat starch suspended in a solution and thereafter applying the dry toppings to the treated surface. Such an application has been shown to decrease wastage of such items as sesame seed topping from as much as 50% to as little as 5%.

The apparatus for carrying out the method comprises a source of starch-based solution, a source of dry topping material, a spray station for pre-treating a surface of the baked good, and a topping station for applying the topping to the treated surface. The spray station includes a spray chamber and a spray station conveyor passing through the spray chamber. The spray chamber includes at least one nozzle coupled to the starch-based solution and arranged for spraying the solution toward the spray station conveyor. The spray station conveyor is arranged for receiving baked goods from the conveyor belt and moving the baked goods through the spray chamber. The topping station includes a dry topping dispenser and a dispenser conveyor in communication with the spray station conveyor passing underneath the dispenser for applying dry topping material to a surface of the baked goods.

An additional feature of the invention is a novel method and apparatus for delivering the dry topping material to the topping station. The apparatus for transporting the granulated topping material includes an elongate hollow wand having a proximal end and a distal end and vibration means attached adjacent the proximal end of the wand for imparting vibrational forces to the wand. Vacuun means coupled to the proximal end of the wand impart a vacuum force at the distal end of the wand and thereby draw material adjacent the distal end of the rod up through the rod to the proximal end. The vibrational forces at the distal end of the wand are transferred to the material adjacent the wand tip to prevent the buildup of peaks and valleys within the topping reservoir.

The foregoing and other objects, features and advantages of the invention will become more readily apparent from the following detailed description of a preferred embodiment of the invention that proceeds with reference to the accompanying drawings.

BRIEF DESCRIPTION OF THE DRAWINGS

FIG. 4 is a side elevation view of the portable spraying and topping applicator sections constructed according to a preferred embodiment of the invention.

FIG. 5A is a partial cutaway side elevation view of the spraying station portion of the apparatus shown in FIG. 1.

FIG. 5B is a partial cutaway front elevation view of the spraying station of FIG. 5A.

FIG. 6A is a side elevation view of the topping station of FIG. 1.

DETAILED DESCRIPTION

Figure 1:
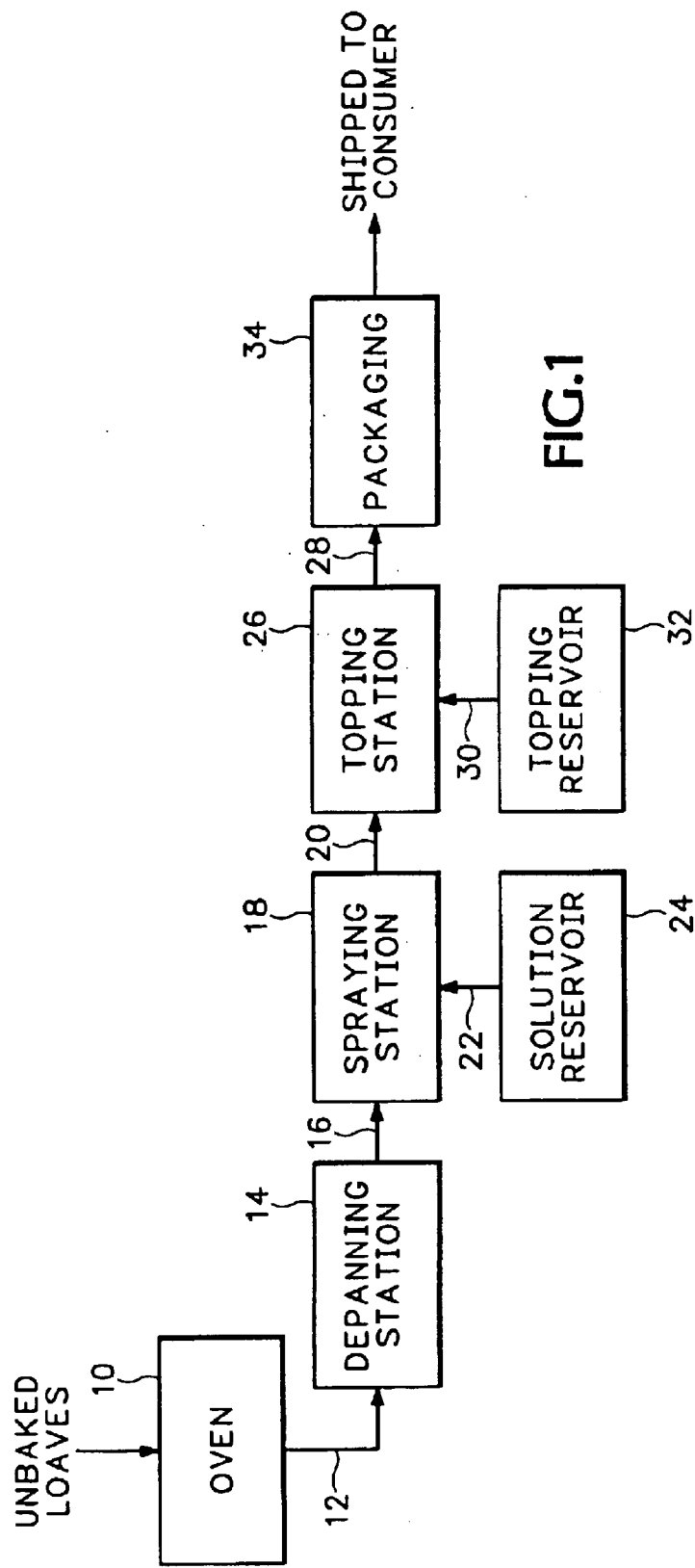
FIG. 1 is a schematic block diagram view of the apparatus implementing the method according to a preferred embodiment of the invention.

The process for applying seeds or other dry toppings to baked goods according to the teachings of the invention is shown broadly in the FIG. 1 block diagram. Briefly, the method comprises applying the dry toppings after the goods have been baked by pre-treating the products with a gluing substance and then applying the dry toppings to the treated surface.

The process below is described with respect to loaves of bread, although it is understood that the process can be applied to any bakery products such as hamburger and hotdog buns, cookies, cakes and the like. The most common dry toppings applied to loaves of bread including sesame seeds, sunflower seeds, bran, cracked wheat, flour, caraway seeds, and 3-grain or 12-grain mixtures. It is understood, however, that the process described herein is applicable to a much wider variety of toppings and the invention should not solely be limited to the specific toppings or baked goods used and described herein.

In the process described, raw dough is produced by means well known in the art and placed within each of the bread pans. Each bread pan typically includes several product-shaping molds or compartments arranged for bounding the dough on five of six sides so that when the dough rises and is baked, that the resulting shape of the bread loaves is the familiar rectangular prism shape.

Figure 2:
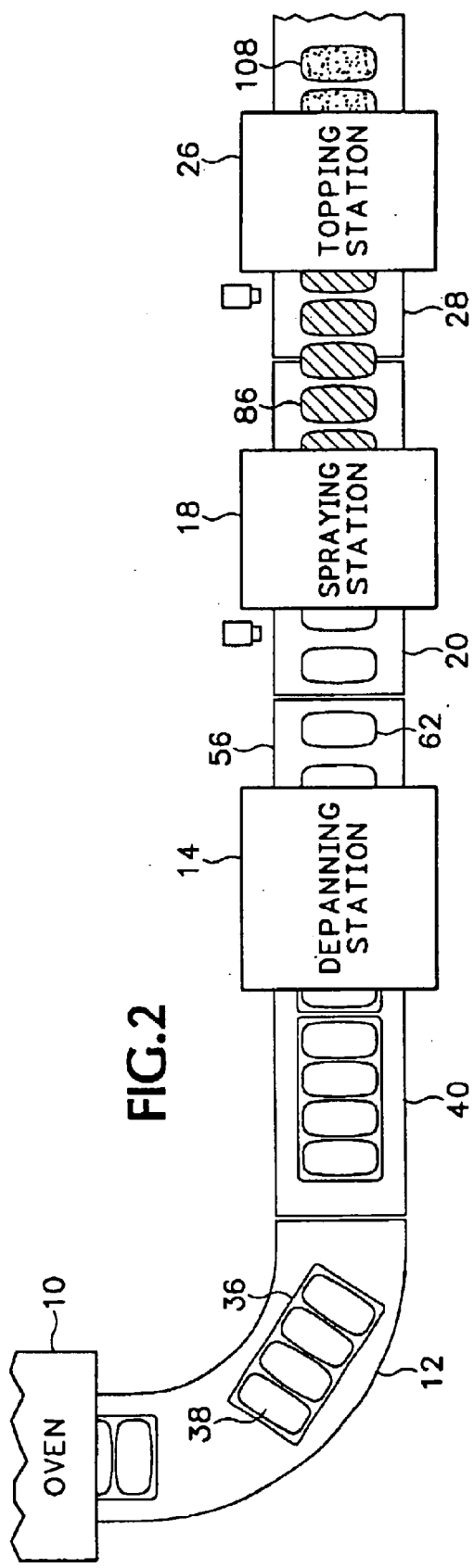
FIG. 2 is a top plan schematic view of a portion of the apparatus of FIG. 1.

Referring to FIG. 1, the pans containing the unbaked loaves are manually inserted within or passed along a conveyor belt into an oven 10 for baking. The pans of baked bread are then manually removed after the prescribed time for baking or, as shown in FIG. 2, cycled out of the oven 10 on a conveyor belt 12 for transportation to a depanning station 14. The depanning station 14 acts to separate the loaves from the pans and directing the loaves along another conveyor 16 leading to a spraying station 18.

As will be described in more detail below, spraying station 18 includes a spray chamber and a spray station conveyor 20 passing through the spray chamber. The spray station conveyor is arranged for receiving baked goods from the conveyor belt 16 and moving the baked goods through the spray chamber. The spray chamber includes at least one nozzle coupled via pumping means 22 to a solution reservoir 24 containing a "gluing" substance such as a starch-based solution. The nozzles within the spray chamber are arranged for spraying the solution toward the spray station conveyor and onto a surface of the depanned loaves passing underneath the nozzles within the spray chamber. Loaves treated in this fashion are referred to s herein as being "pretreated" or including a treated surface.

Figure 7:
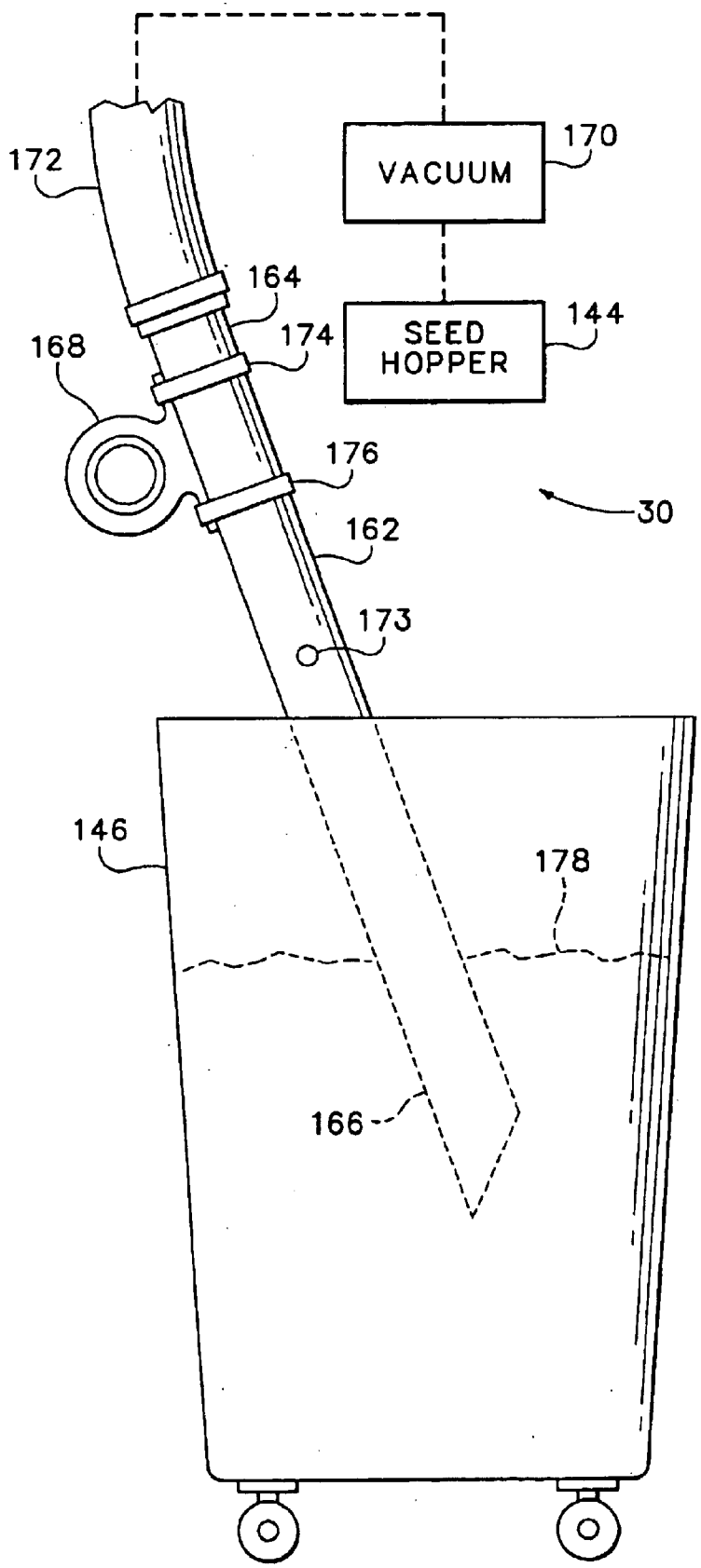
FIG. 7 is a side elevation view of the preferred vibrating wand system adapted to transport the dry topping material from the topping reservoir to the topping stations of FIG. 6A.

The baked loaves, now pretreated with the starch-based solution, are passed along spray station conveyor 20 to a topping station 26 that dispenses the dry topping material onto the pretreated surface. As will be explained in more detail below, the topping station 26 includes at least one dry topping dispenser and a dispenser conveyor 28 in communication with the spray station conveyor 20 passing underneath the dispenser. The dispenser is coupled via dry topping transport means 30 (a preferred implementation of which is shown in FIG. 7) to a topping reservoir 32 that supplies the topping station 26 with dry topping material. The topping station then applies the dry topping to the treated surface of the loaves by dropping the dry topping material onto the loaves from a hopper located above the dispenser conveyor 28.

The now seeded loaves are then sent along a conveyor to a packaging station 34 where the loaves are packaged in polyethylene bags after being cooled to an internal temperature of between about 95° and 110° F. under ambient conditions. The packaged bags are then shipped to stores for consumption.

FIG. 2 is a schematic top plan view of a preferred apparatus used for implementing the seed application process shown in the FIG. 1 block diagram. Pans 36, containing a plurality of loaves of baked bread such as loaf 38, emerge from the oven and are transported over conveyor belt 12 to a depanning station conveyor 40. The preferred conveyors used herein are of the type having multiple parallel motorized rollers. The separation between adjacent motorized rollers has been found to allow seeds and other material to drop through the conveyor system to collection pans positioned underneath the conveyors. It is understood, of course, that other conveyor implementations can be used, such as a belt moving over motorized rollers without departing from the basic seed application process.

Figure 3:
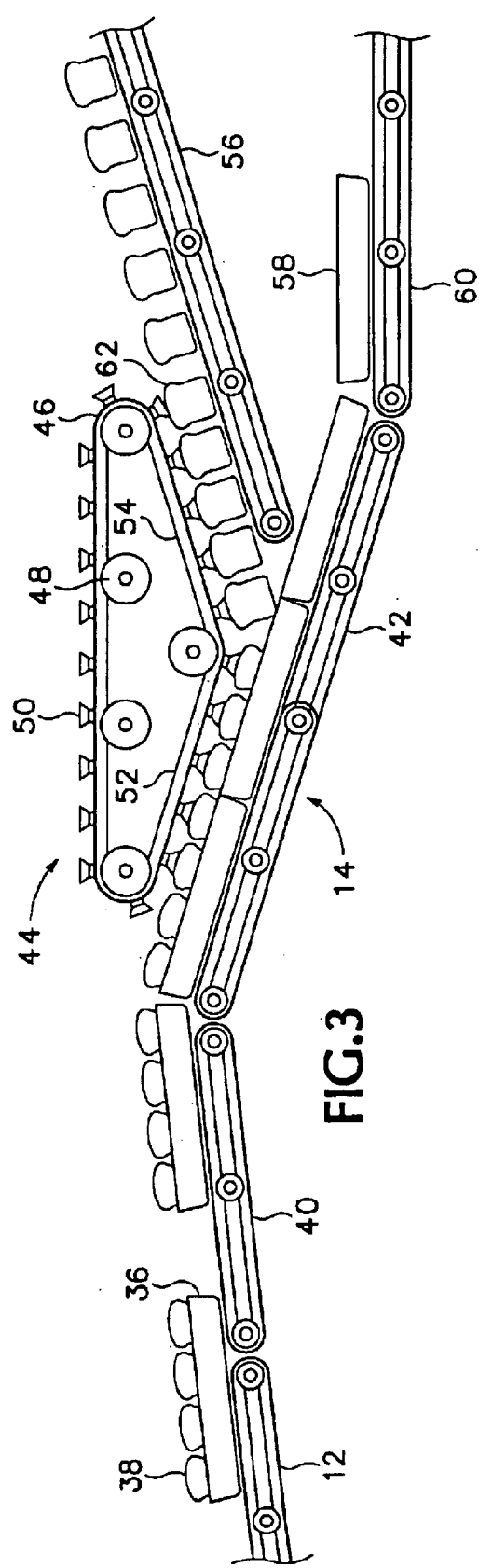
FIG. 3 is a side elevation view of the depanning station portion of the apparatus shown in FIG. 1.

In the depanning station 14 shown in FIGS. 2 and 3, depanning conveyor 40 transfers the filled pans 36 to another depanning conveyor 42 that slopes downward from conveyor 40. Depanning conveyor 42 operates at a slower linear speed than conveyor 40 so that pans that come out of the oven 10 in spaced relationship along conveyor 12 and 40 are crowded together on conveyor 42 to facilitate the depanning process.

The depanning station 14 further includes a depanner assembly 44 suspended at a specific distance above conveyor 42. The depanner assembly includes a belt drive 46 stretched across a plurality of motorized mounts, such as roller 48. The belt drive 46 includes a plurality of vacuum members, such as suction cup 50, that are coupled to a vacuum source (not shown). The depanner assembly 44 includes a first section 52 that is suspended above and runs parallel to the surface of depanning conveyor 42 such that the suction cups 50 are proximal to the top of the bread loaves. A second depanner assembly section 54 bends upward and away from first section 52 and depanning conveyor 42 but parallel to a third depanning conveyor 56.

The belt drive 46 moves at approximately the same speed as the depanning conveyor 42 so that the suction cups 50 are able to engage a proximal loaf and pull it out of the pan. The now empty pans 58 move down conveyor 42 and onto conveyor 60 whereupon the pans are assembled for reuse. The depanned loaves, such as loaf 62, are carried on the suction cups as they revolve onto section 54 of the depanner assembly 44 and are placed onto third depanning conveyor 56 for transportation to the spraying station conveyor 20. The loaves are generally placed on conveyor 56 in a spaced apart relationship corresponding to the distance apart each loaf was while in the pan.

FIG. 4 illustrates at 64 a portable version of the apparatus constructed according to a preferred embodiment of the invention. The apparatus implements the pre-treatment and dry topping application step and is intended to span between depanning conveyor 56 and packaging conveyor 66. The portable apparatus 64 sits on a frame 68 and includes two roller assemblies 70, 72 that enable a user to roll the apparatus 64 out of the production line and into a washing facility.

The portable apparatus couples together the spray station 18, including the spray station conveyor 20, and the topping station 26, including the dispenser conveyor 28. The spray station conveyor 20 is intended to generally operate at a slower linear speed than the depanning conveyor 56 so that the spaced loaves 62 are stacked closer together to minimize the gaps between loaves. The embodiment shown uses Steward chains running at fifty-five feet-per-minute (fpm), with spray station and topping conveyors 20, 28 running at about fifty-three fpm. Spray station conveyor 20 is rotated by motor drives 74 and is arranged to pass baked goods moving along the conveyor through a spray station chamber 76. The spray chamber includes at least one nozzle 78 coupled via a pumping conduit 80 to a solution reservoir 24. The nozzle 78 is arranged for spraying a solution toward the spray station conveyor 20.

The solution reservoir 24 is preferably of a type available from Hobart and includes at least a five gallon chamber 82 and a mixing apparatus 84 adapted to keep the solution properly mixed and in suspension. The distal end of the pumping conduit 80 is inserted below the level of the solution within chamber 82 and acts to draw the solution under a vacuum pressure to the spray station nozzle 78 for application to the baked bread loaf 62, thus resulting in a loaf 86 having a treated surface. Two valves (not shown) are used to deliver the solution to the loaves: a first valve opens to recirculate the topping solution and closes to send the full pump pressure to the spray nozzles; the second valve opens to deliver spray solution to the spray nozzles, and closes to stop the spray solution to the spray nozzles.

A first detector 88 is arranged upstream of the spray station for detecting the proximity of baked goods to the spray station 18 and for activating the spray station nozzle 78 responsive to a positive detection. The preferred detection method is a photoelectric device comprising a light beam emitter and a detector. Objects passing between the emitter and detector interrupt the light signal detected by the detector, thus indicating a proximity of the object to the detector and resulting in a positive detection. The spray station nozzle 78 can then be programmed to begin pumping and then spraying solution downward onto the top surface of the baked loaves after a predetermined delay time calculated to closely approximate the time it takes for a loaf to travel along the conveyor 20 from the location of the detector 88 to the spray station nozzle 78. If no objects are later detected by detector 88, then the nozzle is programmed to shut off after a similar delay time. By activating the spray station nozzle 78 only responsive to positive detections, solution is conserved and wastage and mess is reduced.

One primary advantage of stacking the loaves 62 together by operating spray station conveyor 20 at a slower speed than depanning station conveyor 56 is that little wastage of solution occurs by spraying between loaves. A collection pan 90 is positioned below conveyor 20 immediately beneath spray chamber 76 to further recycle wasted solution. Solution drippage occurring outside of the chamber 76 is guiding into pan using an angled drip guard 91 surrounding the pan. Finally, an exhaust port 92 is coupled to the spray station chamber 76 to draw the atomized solution that did not stick to the loaves upward and out of the chamber.

The preferred solution for pre-treating baked goods with a gluing agent to facilitate post-baking application of dry toppings is a starchy substance in solution with a substance to water ratio of between about 1:20 and 1:4. The most preferred solution used to pre-treat the baked goods in the spray chamber 88 is formed from 11.75 parts water at seventy-five to eighty degrees Fahrenheit, 0.25 parts vinegar (200 gain) at ambient temperature and one part pregelatinized wheat starch, such as that marketed by Midwest Grain Products under the tradename Pregel Adhere 2000. The vinegar acts as an anti-mold material. Table salt can also be added for flavor. Finally, a hydrated emulsifier can be added to the solution to make sure all elements stay in suspension.

To make the solution, the water and vinegar are added to the mixing chamber 82 first and the starch added last. The solution is mixed using the mixer apparatus 84 for approximately eight minutes or until substantially all of the starch particles are in suspension. The spray mixture can then be transferred to a holding tank (not shown) for circulation through the spraying system, or can be drawn directly from the mixing chamber 82. The spray system circulation, e.g. the pumping conduit 80, includes an inline 200 mesh filtering screen (not shown) that it passes through to filter out the particulates.

Other pre-treatment "gluing" solutions have been tested but found to be less effective than the wheat starch mixture described. These other substances including hydrocolloids (gums) and proteins in varying solutions with concentration of between approximately 3.5% and 33%.

FIGS. 5A and 5B illustrate side and front views, respectively, of the components making up the preferred implementation of the spraying station 18. This implementation is nearly identical to that shown in FIG. 4 except that the detector 88 is located outside of the spray chamber 76 and is pointed horizontally along a lateral upstream portion of the spray station conveyor 20. Two spray nozzles 78, 94 are mounted on a horizontal frame member 96 positioned laterally within the spray chamber 76. The nozzles 78, 94 can be adjusted laterally along frame member 96 to adjust for varying sizes of baked products and spray patterns.

The spray nozzles 78, 94 are preferably Spray Systems brand Part # ⅛ JJAUCO-SS-20-SU13. These have a fan spray nozzle. The atomization air is set at fifteen pounds and the liquid set at forty pounds of pressure. This sprays out liquid at 0.95 cfm (1.45 gph). The spray patterns 98, 100 for the respective nozzles 78, 94 are adjusted to cover the top of the bread loaves without spraying past the ends of the bread. The nozzles are normally adjusted about nine inches above the conveyor 20 and six inches apart to cover the loaves properly. Other sized baked goods would of course require different spray settings. An alternate configuration uses a Rotoclean attachment #106A with a #RC-4L nozzle fired by an Asco ⅜" port electric valve.

Figure 6B:
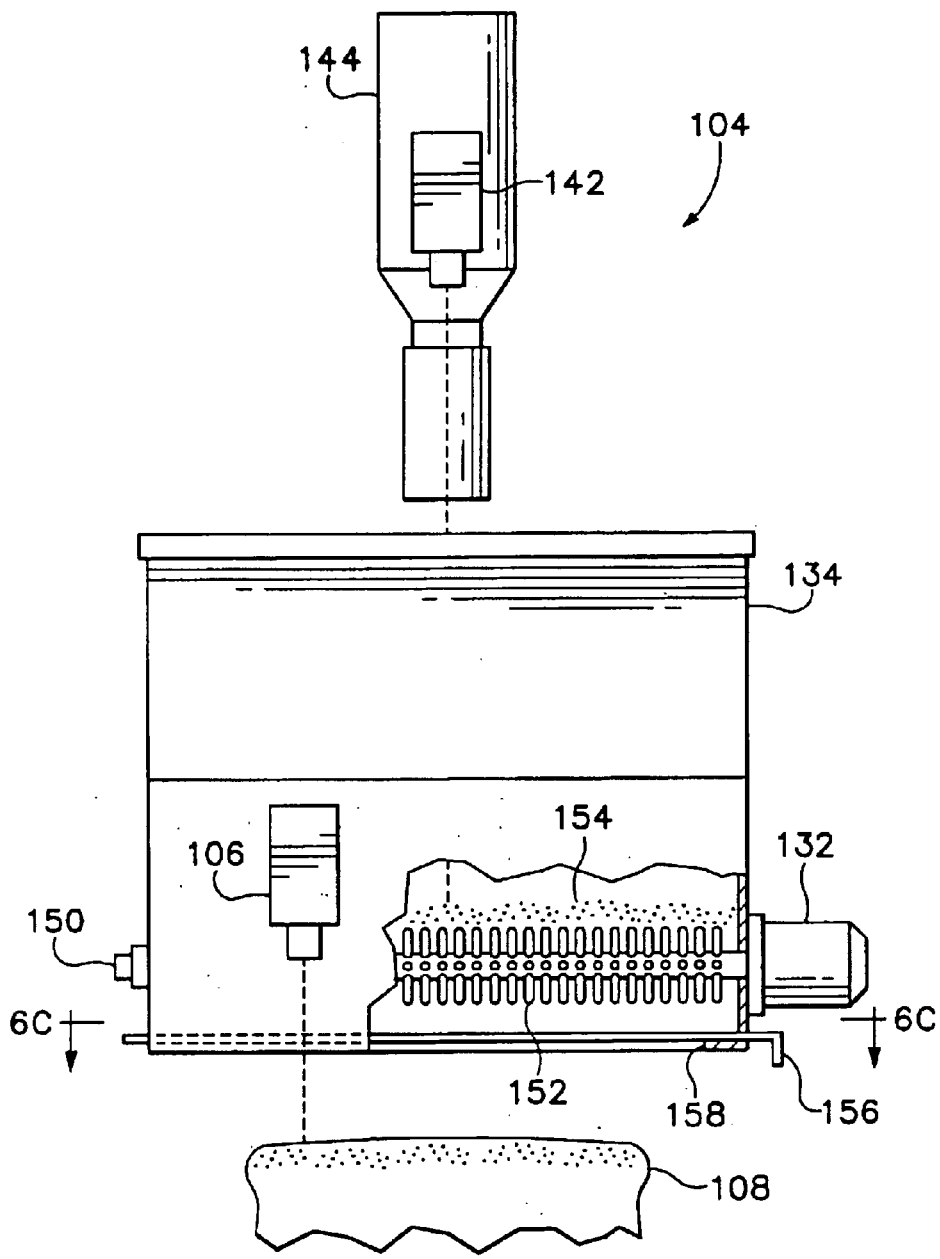
FIG. 6B is a partial cutaway front elevation view of the topping station of FIG. 6A taken along lines 6B—B.
Figure 6C:
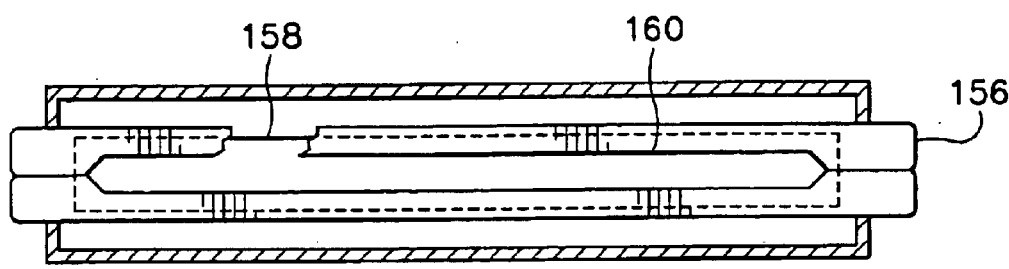
FIG. 6C is a section view taken along lines 6C—6C in FIG. 6B illustrating the bottom aperture of the seeder through which dry toppings are released onto baked goods.

FIGS. 6A to 6C illustrate in more detail the topping station 26. The bread loaves 86 emerging from the spray chamber 76 have a light sheen of the solution (shown by the cross-hatched lines) coated on the top of the loaves. The loaves then move from the spray station conveyor 20 to the dispenser conveyor 28, operating at a similar speed as conveyor 20 to minimize the gaps between adjacent loaves. Dispenser conveyor 28 transports the loaves underneath one or more overhead topping-release assemblies 102, 104. Each assembly includes a different topping—for instance flour in assembly 102 and toasted sesame seeds in assembly 104. When items are detected on the conveyor, as when detector 106 mounted upstream of assembly 102 detects the proximity of a loaf 86, the release mechanism (described below) is tripped and dry topping material is dropped onto the coated loaf tops to produce a first-topped loaf 108 (shown with the speckled top).

Turning first to FIG. 6A, the topping station 26 includes a series of two topping release trays 102, 104 to release in succession flour and sesame seeds onto the coated surface of the loaves. The coated loaves 86 are moved from the spray station conveyor 20 to the dispenser conveyor 28 in side-by-side arrangement so that the gaps between the adjacent loaves is minimized. As the loaves move underneath detector 106, a signal is sent to control box 110 to begin operating of the topping spreader 112 mounted to a bottom portion of the Christy seeder tray 114 containing the flour. The control box includes a power button 116 and a spreader adjust dial 118 to alter the speed at which the spreader is rotating and thus the amount of dry topping material released onto the loaves. Excess dry topping material is captured within a catch tray 120 located beneath the dispenser conveyor 28.

Positioned above the seeder tray 114 is the proximal portion of the means 30 for transporting the dry topping from reservoir 32 to the seeder tray 114. The distal end of the dry topping transporting means is described with more particularity below with respect to FIG. 7. Briefly describing the proximal portion, however, a topping detector 122 detects a level of topping material within the Christy seeder tray 114. If the detected level is low, then an activation signal is sent to the Vac-u-max system that draws topping material from the reservoir 32 into hopper 124 and thereafter into seeder tray 114 for a predetermined time period or until the seeder tray 114 is filled. The Vac-u-max is a vacuum system that uses compressed air through a venturi to create vacuum. The Vac-u-max control has a timer that cycles the vacuum on for a short time (to draw topping material up to the Vac-u-max hopper 124) then off for a short time (to let what topping was pulled up into the hopper 124 drop down into the Christy seeder tray 11 4). The basic operation of such a system are known to those skilled in the art and thus is not described in further detail here.

The second topping station 104 includes similar parts which have been renumbered for the sake of clarity including: detector 126, second-topped bread 128, control box 130, spreader 132, seeder tray 134, power control button 136, topping adjust dial 138, catch pan 140, topping detector 142, and hopper 144. The second topping reservoir 146, this time containing toasted sesame seeds, is delivered through means 30 to hopper 144 when a low topping amount is detected by detector 142 within seeder 134. The once-topped loaves 108 pass beneath the seeder tray 134 on conveyor 148, after which they are moved on to faster conveyor 149, which separates the loaves and transports them to packaging station 34.

An important embodiment of the invention contemplates each station (or substation) as including its own conveyor. Thus, the spray station has conveyor 20, the first topping station has conveyor 28, and the second topping station has conveyor 148. A primary concern in bakeries is cleanliness and the prevention of cross-contamination. If spray station conveyor 20 were allowed to run beneath the first topping release station 102, then the dry topping would become affixed to the conveyor 20, now made sticky by passing underneath the spray nozzles 78, 96 within the spray station 18. Similarly, if first topping station conveyor were also allowed to run beneath the second topping release station 104, then cross-contamination between the two toppings would occur and cleaning would be made more difficult. To facilitate cleaning, each of the topping station conveyors 28, 148 include a brush roller, such as brush rollers 151 and 153, that rotates between the belt drive loop and removes the deposits on the conveyor so that they fall into respective catch pans 120, 140.

A cutaway view of the spreader 132 is shown in FIG. 6B. Upon a positive detection of an object such as loaf 108, detector 106 positioned upstream of seeder tray 134 sends a positive detect signal to control box 130. A subsequent activation signal from control box 130 activates the motorized spreader 132, which begins rotating within the seeder tray 134. Spreader 132 includes a rod 150 suspended within the bottom portion of seeder tray 134 on which are mounted brush-like projections 152 or the like. As the rod 150 rotates, the bush-like projections 152 sweep the sesame seeds 154 into the lower portion of the seeder tray 134. A mandrill 156 is inserted adjacent a bottom opening 158 of the seeder tray and defines a shaped opening 160 through which the sesame seeds pass. The size and shape of the opening 160 determines the spread and rate at which the sesame seeds 154 are released from the topping station onto loaf 108.

FIG. 7 illustrates the distal end of the means 30 for transporting the dry (granulated) topping material from the topping reservoir 146 to the seed hopper 144, and thence to the seeder 134. The apparatus includes an elongated hollow wand 162 having a proximal end 164 and a wand tip located at a distal end 166. A vibration assembly, such as pneumatic tube vibrator 168, is attached adjacent the proximal end 164 of the wand to impart vibrational forces to the wand 162. Vacuum means 170 are coupled to the proximal end of the wand 162 for imparting a vacuum force at the distal end 166 of the wand and thereby drawing the topping material up through the hollow interior of the rod to the proximal end 164. A flexible hose 172 is coupled to the proximal end 164 of the wand 162 to communicate the granulated material drawn up through the wand to an opposing end of the flexible hose, terminating at seed hopper 144. The wand 162 includes a hole 173 formed through a wall of the wand to the hollow interior for communicated air into the wand. Finally, it is preferred that the distal end 166 of the wand be formed at an oblique angle, preferably about forty-five degrees, to facilitate insertion of the wand tip into the topping material.

The wand 162 is Vac-u-max part #18698 and the vibrator is Vibco part #VS-190. The wand is 4 foot long which sticks in a barrel of topping and the vibrator is hose clamped, via clamps 174, 176, on the end of the wand sticking out of the barrel. The vibrator is turned on when the Vac-u-max is sucking topping out of the barrel. The vibration of the wand simply keeps the topping flowing around the wand tip.

The apparatus constructed according to a preferred embodiment of the invention is intended to address the difficulties inherent with easily drawing granulated material from a source and transporting it to a destination. A primary problem occurs when the granulated material is pulled from a localized area within the reservoir 146, where the level of the topping material is shown by dashed line 178 contained within a barrel so that the material is constrained within the walls of the barrel. Because the material is granulated and not liquid, frictional forces often cause the build up of mounds and valleys as localized portions of the material are sucked up into the wand so that the distal end 166 of wand 162 has to be continuously moved within the barrel to vacuum up the topping material. It has been found, however, that imparting a vibration force to the distal end of the wand (via the pneumatic tube vibrator 168) evens out these peaks and valleys by transferring the vibrational force to the material adjacent the wand. This results in a much simpler method for transporting granulated material under vacuum than, for instance, vibrating the entire reservoir 146.

Having described and illustrated the principles of the invention in a preferred embodiment thereof, it should be apparent that the invention can be modified in arrangement and detail without departing from such principles. We claim all modifications and variation coming within the spirit and scope of the following claims.

We claim:

1. A method for applying toppings to baked goods comprising the steps of:
    applying a starch-based solution onto a surface of the baked goods after baking to form a treated surface; and
    applying toppings onto the treated surface of the baked goods,
    wherein the step of applying the starch-based solution onto the surface of the baked goods includes the steps of:
        transporting the baked goods beneath spray nozzles, said spray nozzles located within a spray chamber and in communication with a source of the starch-based solution; and
        spraying the solution onto a surface of the baked goods as the baked goods are moved proximal the spray nozzles.
2. The method of claim 1, further including the steps of:
    detecting the proximity of the baked goods to the spray nozzles; and
    activating the spray nozzles responsive to a positive detection of the baked goods.

* * * * *

UNITED STATES PATENT AND TRADEMARK OFFICE
CERTIFICATE OF CORRECTION

PATENT NO.         : 6,733,809 B2  
APPLICATION NO.    : 09/935147  
DATED              : May 11, 2004  
INVENTOR(S)        : Zimmerman et al.

It is certified that error appears in the above-identified patent and that said Letters Patent is hereby corrected as shown below:

Column 2, line 5, "wand. Vacuun means" should read --wand. Vacuum means--.

Column 2, line 39, "lines 6B—B." should read --lines 6B—6B.--.

Column 3, line 29, "to s herein" should read --to herein--.

Column 3, line 29, "being "pretreated"" should read --being "pre-treated"--.

Column 5, line 1, "recirculate the" should read --re-circulate the--.

Column 5, line 43, "(200 gain) at" should read --(200 grain) at--.

Column 7, line 4, "tray 11 4)." should read --tray 114).--.

Signed and Sealed this

Eighth Day of January, 2008

JON W. DUDAS  
*Director of the United States Patent and Trademark Office*